March 9, 1937.  H. L. MERRICK  2,073,246
INTEGRATING MEANS
Filed March 12, 1932  2 Sheets-Sheet 2
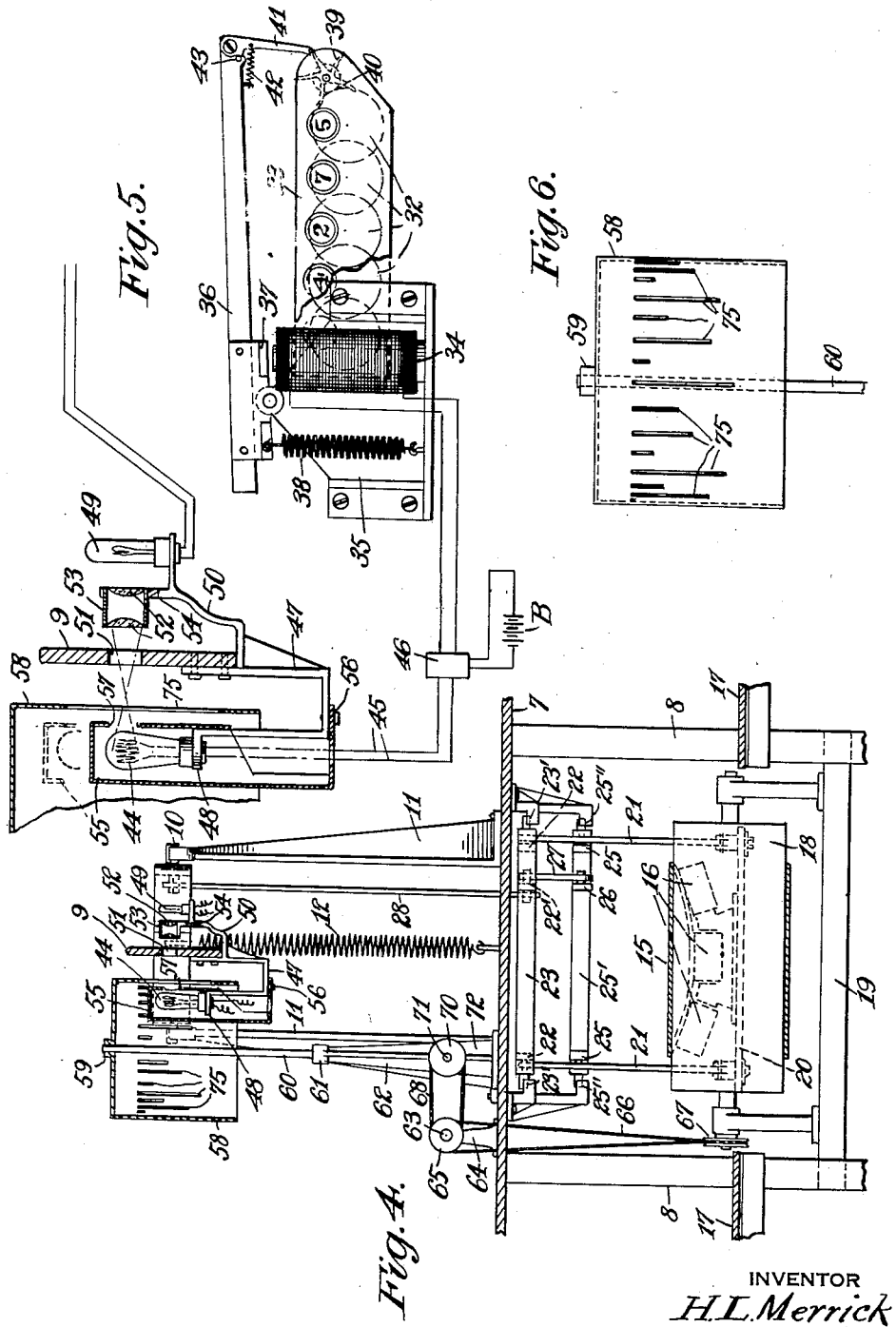
INVENTOR
H. L. Merrick
BY
John O. Seifert
ATTORNEY Patented Mar. 9, 1937

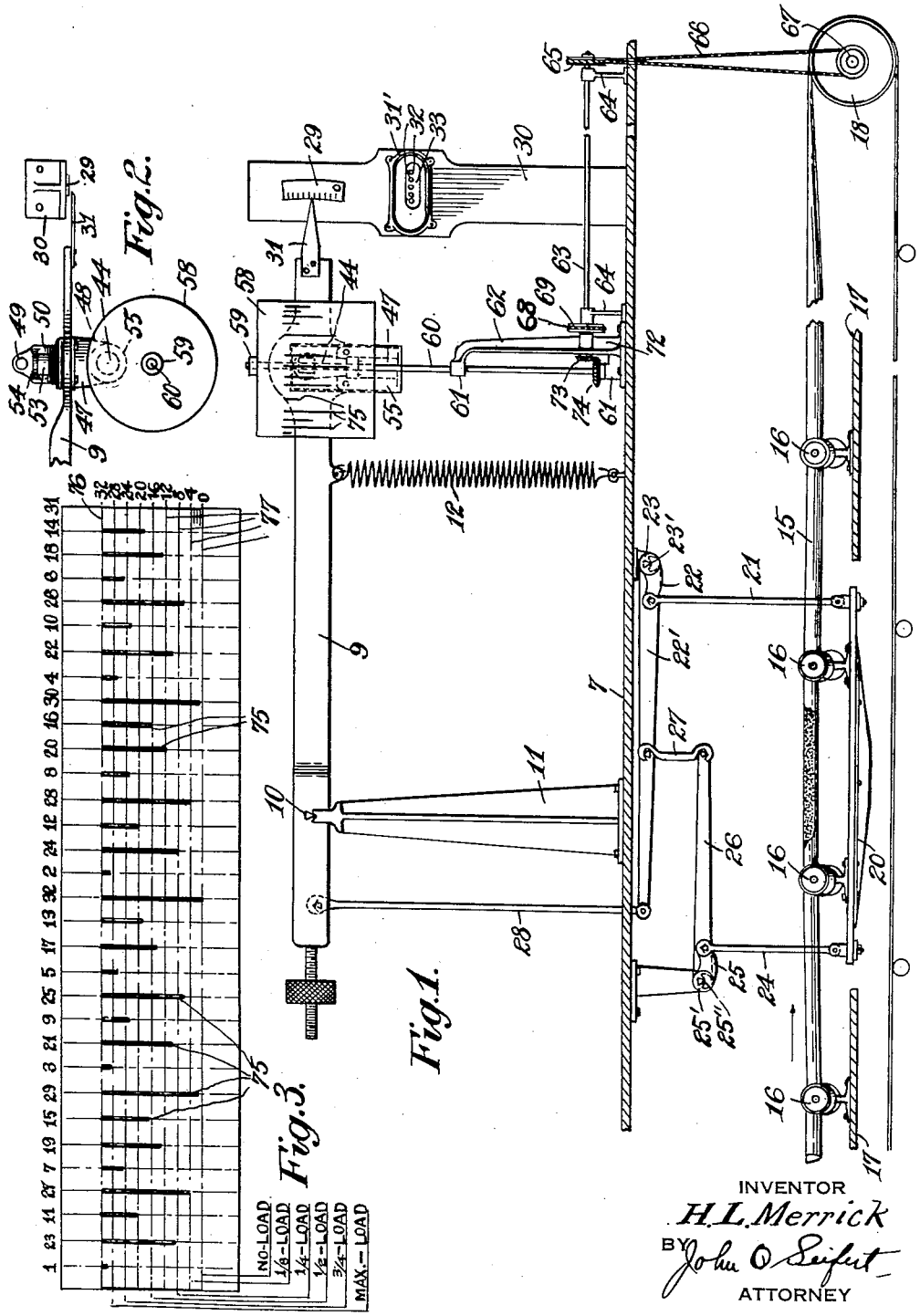

2,073,246

UNITED STATES PATENT OFFICE 2,073,246

INTEGRATING MEANS

Herbert Lansing Merrick, Passaic, N. J.

Application March 12, 1932, Serial No. 598,400

9 Claims. (Cl. 235—61)

This invention relates to integrating means particularly adapted for use in connection with weighing mechanism including a scale beam arranged with means to support a traveling conveyer and means to balance the load transported by the conveyer operative to normally maintain the scale beam in a position of equilibrium and to counterbalance an applied load, and a register with electrically operating means to actuate the register to totalize and indicate the weight of successive weighings, and it is the object of the invention to provide simple and inexpensive means to effect intermittent operation of the register actuation means upon each predetermined length of loaded conveyer travel and indicate the weight transported by each of said lengths of conveyer travel.

The embodiment of the means for controlling the actuating means for the register comprises a light sensitive cell connected in the electric circuit of the register actuating means and carried by the scale beam in spaced relation to a source of light mounted on the beam and the light rays are interrupted or intermittently blocked from the light sensitive cell to render the cell periodically active and the register actuating means operative by a screen in the form of a cylinder rotated in synchronism with the speed of travel of the conveyer having one revolution imparted thereto for each predetermined length of conveyer travel and in the path of travel of the light rays from the source of light to the light sensitive cell, and said cylinder being arranged with a series of equidistantly circumferentially spaced slots of varying lengths with the increments of increase or decrease in length being uniform and the slots of greater length separated by one or more slots of less length so that the light rays will be intermittently transmitted at uniform intervals to the light sensitive cell through a number of slots varying with the weight suspended during each predetermined length of conveyer travel thereby correctly registering the weight transported by said successive lengths of conveyer travel and prevent the register from not functioning or the missing of a registration or count due to the rapidity of the actuation of the register which will likely occur should the slots of successive lengths be next to each other.

In the drawings accompanying and forming a part of this application, Figure 1 is an elevational view of an embodiment of weighing mechanism and register means showing the improved controlling means for the register actuating means relative to a scale beam and the operative connection thereof with a conveyer.

Figure 2 is a plan view of the controlling means looking at the top of Figure 1, comprising a light sensitive cell shown in dotted lines, a source of light carried by the scale beam, and a slotted light interrupting cylinder interposed between the same.

Figure 3 is a view of a development of the slotted light interrupting cylinder showing the specific arrangement of a series of slots therein.

Figure 4 is an end view looking at the right of Figure 1.

Figure 5 is a detail view, partly in section, of the actuating means for the register and the mounting of the light sensitive cell and source of light on the scale beam, and showing the electrical connection between the register actuating means and the light sensitive cell; and Figure 6 is an elevational view of the slotted light interrupting cylinder.

Similar characters of reference designate like parts throughout the different views of the drawings.

In the embodiment of the invention illustrated in the drawings the weighing mechanism is mounted upon a support or table 7 supported by standards 8 and comprises a scale beam 9 pivotally suspended adjacent one end thereof by knife edge pivots 10 from standards 11 mounted on the support 7 at opposite sides of the beam, and a spring 12 to normally maintain the scale beam in a position of equilibrium and counterbalance an applied load attached at one end to the support 7 and at the other end to the scale beam adjacent the end at one side of its pivot support on the standards 11.

The scale beam is adapted to continuously weigh material brought to the weighing point by an endless conveyer belt 15 having its upper or carrying stretch supported on trough forming rollers 16 mounted upon a suitable support 17, as shown in Figure 1, the conveyer passing around and being mounted by drums 18, only one end being shown in the drawings, rotatably supported on cross member 19 of the standards 8, and one of the drums being driven from a source of power (not shown). A portion of the upper stretch of the conveyer belt adjacent the scale beam supporting standards 11 is supported from the scale beam by a platform 20 carrying a set of the trough forming and belt supporting rollers 16. One end of the platform is suspended by rods 21 from lever arms 22 rigid with a rock bar 23 fulcrumed at the ends in hangers, as at 23', mounted on the underside of support 7, the opposite end of the platform being supported by rods 24 from lever arms 25 rigid with a rock bar 25' having a fulcrum support, as at 25", in hangers also mounted on the underside of support 7 and to which rock bar 25' a lever 26 is fixed at one end with the opposite end suspended by a link 27 from an intermediate portion of a lever 22' fixed to rock bar 23 with the free end connected to the end of the scale beam at the side of the support 10 opposite spring 12 by a rod 28. The weight of the load carried by the conveyer belt is indicated by a graduated plate 29 arranged on a standard 30 fixed to the support 7 adjacent the free end of the scale beam which carries a pointer 31 movable relative to plate 29 whereby variations in the loads carried by the conveyer are indicated and may be readily observed.

The standard 30 is arranged to carry a register 31' (Figure 1) to totalize and indicate the weight of successive weighings of successive quantities of material transported over the platform 20, comprising a series of numeral carrying wheels 32 (Figure 5) having means to transmit the movements of one numeral wheel of lower denomination upon a complete revolution thereof to the numeral wheel of next higher denomination, an alined row of digits on said wheels being exposed through windows in a plate 33 constituting a part of the carrying casing for said wheels. The numeral wheels are advanced or actuated by an electromagnet 34 adapted to be intermittently energized from a source of electricity, as indicated by a battery B, and mounted on a bracket 35 supported in the register casing adjacent the wheels to oscillate a lever 36 of non-magnetizable material pivotally mounted on the bracket 35 and arranged with an armature in the form of a plate 37 of magnetizable material mounted in line with the core of the electromagnet and adapted to be normally positioned in spaced relation to said core by a spring 38 attached at its opposite ends to the lever adjacent the mounting thereof and a fixed part of the bracket 35. The oscillation of the lever 36 is transmitted into rotary movement of the digit wheels 32 by pawl and ratchet mechanism comprising a toothed wheel 39 rotatably mounted on the wheel supporting plate 33 and operatively connected to the wheel of lowest denomination, as indicated at 40 in Figure 5, a pawl 41 pivotally supported at the free end of the lever 36 being yieldingly urged by a spring 42 to abut a pin 43 extended from the lever 36 to position the pawl to engage a tooth of and actuate the wheel 39 during the downward movement of the lever 36 and permit free movement of the pawl past the toothed wheel in the upward movement of the lever without imparting movement to said toothed wheel, as clearly shown in Figure 5.

The register is actuated in synchronism with a predetermined length of conveyer travel and proportionally with the position of the pointer 31 relative to the graduated plate 29 by controlling the energization of the electromagnet 34, and thereby the actuation of the digit wheels 32. The energization of the magnet 34 is controlled through the intermittent transmission of light rays to a photoelectric tube or a selenium light sensitive cell of the usual structure, as shown at 44, connected in the electric circuit of the electromagnet through electric conductors 45, the electrical impulses produced by the light sensitive cell being amplified or increased by an amplifier of suitable structure and power, shown in a conventional manner at 46 in Figure 5, to assure positive energization of the electromagnet. The light sensitive cell is mounted on the scale beam adjacent the pointer 31 to participate in the reciprocatory movements of the beam imparted thereto by variations in the quantity of material transported by each successive length of conveyer travel and constituting one of the quantities the value of which is to be integrated by a U-bracket 47 secured at the end of a leg thereof to the scale beam, as by bolts threaded into the beam, the opposite leg having a lateral extension 48 at the extremity upon which the cell 44 is mounted. The light sensitive cell 44 is operative to close the electric circuit of the electromagnet 34 by a beam of light, as from an electric incandescent lamp 49 connected in an electric circuit with a source of electricity, which may be the source B of the electromagnet and light sensitive cell, or an independent source, as indicated in Figure 5. The lamp 49 is carried by an arm 50 extending laterally from the bracket 47 on the side of the scale beam opposite the light sensitive cell 44 to position the lamp 49 so that the beam therefrom will be in horizontal alinement with the light sensitive cell whereby the beam or light rays of the lamp are directed through an opening 51 in the scale beam by a condenser embodying a pair of lenses 52 mounted in a tubular casing 53 in registry with opening 51 and supported in an arm 54 extended from the lamp supporting arm 50, as shown in Figure 5. To assure actuation of the light sensitive cell 44 only by the light rays of the lamp 49 the cell is enclosed in a housing 55 mounted on the lamp supporting bracket 47, as at 56, with the upper portion of the housing entirely enclosing the cell and having an opening 57 in registry with the scale beam opening 51 and directly opposite the light sensitive plate of the cell. It will readily be seen that the light rays are in constant alinement with the light sensitive cell in all positions of the scale beam.

To actuate the electromagnet 34 in correspondence with a predetermined length of travel of the conveyer belt 15 and weight of the load carried thereby the light rays are interrupted or intermittently blocked from the light sensitive cell, the number of light interruptions occurring during a predetermined length of conveyer travel varying proportionally to the variations in the weight of material carried by said length of conveyer travel, and thereby, the actuation of the digit wheels 32 of the register through the oscillation of lever 36. This result is accomplished by a light interrupter actuated at a constant speed in synchronism with the rate of travel of the conveyer belt, comprising a hood 58 arranged with a cylindrical body having one end closed and arranged with a hub portion 59 whereby it is mounted on the upper end of a shaft 60 rotatably supported in bosses 61 of a bracket 62 mounted on the table 7, the shaft being rotated by the travel of the conveyer belt 15 through a shaft 63 rotatably mounted in brackets 64 fixed on the table 7, and rotated by a belt 66 passing around a pulley 65 fixed to an end of the shaft 63 and a pulley 67 fixed to the shaft of the adjacent conveyer supporting drum 18, the rotation of the shaft 63 being transmitted to the light interrupter carrying shaft 60 through a belt 68 passing around a pulley 69 fixed on shaft 63 and a pulley 70 fixed on one end of a stud shaft 71 rotatably mounted in a bracket 72 and having a beveled gear 73 fixed thereon meshing with a beveled gear 74 mounted on the light interrupter carrying shaft 60. In the present instance the pulley and gear ratios are such that the hood will have one complete revolution imparted thereto for each thirty-two (32) feet of conveyer belt travel. The hood body supporting shaft 60 is mounted on the support 7 in alinement with the light sensitive cell with the hood body eccentrically encircling the light sensitive cell enclosing housing 55 to position a peripheral portion of the hood body adjacent to the housing opening 57 and in interposed relation to said housing opening and the opening 51 in the scale beam, as clearly shown in Figures 2, 4 and 5, whereby the light rays from the lamp 49 are intercepted and prevented from entering the housing opening 57.

The light rays are permitted to enter the housing 55 through opening 57 at predetermined intervals proportional to the weight of the load carried by the thirty-two (32) feet of length of conveyer travel by arranging the peripheral wall or skirt portion or body of the hood 58 with a series of equidistantly spaced slots 75 varying in length in equal increments of length from minimum to maximum length and arranged so that adjacent slots vary in length more than one increment of length, said slots commencing from a predetermined point extending horizontally about the periphery of the cylinder and adjacent the upper portion thereof relative to which point the light rays from lamp 49 will be focused in the maximum load position of the scale beam, as indicated at 76 in Figure 3, and the slots are extended in a downward direction from said point or line 76 with the slot of greatest length terminating above the light rays when the scale beam is in no load position, whereby electric impulses will be transmitted by the light sensitive cell to the electromagnet 34 of the register in all of the positions of the scale beam in synchronism with the conveyer travel. It will readily be seen that in the maximum load position of the scale beam the greatest number of electric impulses will be transmitted to the electromagnet as all of the slots will pass in line with the opening 57 in the sensitive cell enclosing housing 55 for permitting a regular intermittent passage of light to the sensitive cell 44 and the number of electric impulses will be decreased proportionally to the decrease in the load on the scale beam as the number of slots passing the housing opening 57 will be proportionally decreased by the movement of the light sensitive cell with the scale beam in a downward direction when only the slots of greater length will be in line with the light rays and the housing opening 57 in the lower or reduced load positions of the scale beam.

In the present instance the light interrupter cylinder 58 is arranged with thirty-two (32) slots so that the passage of one slot relative to the housing opening 57 will represent one foot of conveyer travel, as it is the usual practice to actuate the conveyer belt 15 at a rate of travel of three hundred and sixty (360) feet of travel per minute and rotate the cylinder 58 at a rate of speed that three hundred and sixty (360) slots will pass a predetermined point every minute of travel of the cylinder. Therefore, in the maximum load position of the scale beam an electric impulse will be transmitted to the electromagnet for every foot of conveyer travel and all of the material of predetermined maximum weight carried by the conveyer will be weighed and the total weight indicated by the register but this will not occur in the other positions of the scale beam and the transporting of a load of reduced weight by the conveyer.

It is the principal object of this invention to register the weight of material transported by the successive lengths of conveyer travel whether the load is of the predetermined maximum weight or less than such weight and regardless of the position of the scale beam by reducing the elapsed time between the successive passage of the slots of longer length relative to the housing opening 57 when the load is less than the predetermined maximum weight and the scale beam is in an intermediate weighing position. This is accomplished by intermingling the slots 75 relative to their lengths, as shown in Figure 3, and to clearly describe the arrangement or disposition of the slots the cylinder is developed in plan in said Figure and arranged with horizontal indicia lines 77 to indicate the weighing positions of the successive increments of length of the slots and scale beam, and said lines being equal in number to the number of slots, that is, in the present instance, there are thirty-two (32) lines. The weighing positions of the scale beam from maximum load to no load positions are approximately designated at the left hand side of Figure 3. Referring to Figure 3, it will be noted that the slots are enumerated from "1" to "32" successively in respect to their lengths, the shortest slot being indicated by "1" and the longest by "32". The slots are so arranged that successive pairs of slots of successively increased increments of length, such as slots "1" and "2", "3" and "4", and so on to slots "31" and "32", are diametrically opposite to each other on the cylinder. This arrangement is effected by commencing with the slot "1" of minimum or infinite length at the left hand edge of the development of the cylinder, the next slot succeeding in length, which is slot "2", is disposed sixteen separating spaces from slot "1", then the next slot succeeding in length, which is slot "3" is placed midway between slot "1" and "2" with slot "4" arranged sixteen spaces to the right of slot "3", and slot "5" is positioned midway between slots "2" and "3" with slot "6" sixteen spaces to the right of slot "5", and then slot "7" is placed midway between slots "1" and "3" with slot "8" sixteen spaces to the right from slot "7". The disposition of the slots in this manner is continued with the result that slot "32" of maximum length is midway of the lateral edges of the cylinder development shown in Figure 3, and all of the odd numbered slots are at the left hand side of slot "32" and the even numbered slots are at the right hand side of slot "32". Slot "31" is shown to be partly arranged in both of the lateral edges so that it will be diametrically opposite slot "32" when arranged in the cylinder wall. By this arrangement of the slots, the slots of different lengths are systematically disposed in spaced relation to each other so that adjacent slots vary in length more than one increment of length and no great length of the conveyer belt 15 will travel over the platform 20 without the weight of the load transported thereby being indicated by the register. By way of illustration, let it be assumed that the scale beam is in ½ load position, as indicated in Figure 3, an electric impulse will be transmitted by the light sensitive cell to the electromagnet for every two feet of conveyer belt travel. If the beam is in ⅛ load position an electric impulse will be transmitted for every eight feet of conveyer travel, as the slots intersecting the light rays, which are slots "29", "30", "31" and "32", are eight spaces apart.

Having thus described my invention, I claim:

1. In an integrating device, a register, electromagnetically operated means connected in a normally open electric circuit adapted to be energized and actuate the register upon the closing of said circuit, a source of light, a light sensitive cell connected in and operable by the exposure to said light to close the circuit of the actuating means for the register, mechanism for simultaneously moving the light sensitive cell and source of light in correspondence with fluctuations in the value of one of the quantities to be integrated, and a light interrupter to travel between the light sensitive cell and source of light at a constant speed representative of the value of the other quantity to be integrated comprising a screen having a series of slots extending from the same plane and varying in length in increments of equal length from minimum to maximum length and arranged so that adjacent slots vary in length more than one increment in length to permit intermittent passage of light rays from the source of light to the light sensitive cell through the slots at intervals corresponding with fluctuations in the value of the first quantity to be integrated to activate the cell and effect intermittent closing of the circuit of the actuating means for and actuation of the register.

2. In an integrating device, a register, electromagnetically operated means connected in a normally open electric circuit adapted to be energized and actuate the register upon the closing of said circuit, a source of light, a light sensitive cell connected in and operable when exposed to the source of light to close said circuit of the actuating means for the register, mechanism for moving the light sensitive cell in correspondence with fluctuations in the value of one of the quantities to be integrated, and a light interrupter comprising a rotatable hood having a cylindrical body with a series of slots therein extending from the same plane longitudinally of the peripheral wall of the body and varying in length in increments of equal length from minimum to maximum length and arranged so that adjacent slots vary in length more than one increment of length, said hood being mounted to enclose the light sensitive cell and travel between the light sensitive cell and source of light at a constant speed representative of the value of the other quantity to be integrated to permit intermittent passage of light to the light sensitive cell through the slots at intervals corresponding to fluctuations in the value of the first quantity and effect intermittent closing of the circuit of the electromagnetically operated register actuating means.

3. In an integrating device, a register, electromagnetically operated means adapted to be energized and actuate the register when the circuit thereof is closed, a source of light, a light sensitive cell movable in correspondence with fluctuations in the value of one of the quantities to be integrated and connected in the operating circuit of the electromagnetically operated actuating means for the register operable to normally open said circuit when obscured from the source of light and close said circuit when exposed to the source of light, a cylindrical member rotatable in a plane transversely to the movement of the light sensitive cell, said cylindrical member encircling the light sensitive cell and arranged with a series of slots extending longitudinally thereof varying in length in increments of equal length from minimum to maximum length and arranged in pairs of diametrically opposite slots with a slot of each pair of said slots being of a length greater than the opposite slot equal to one increment of length, and means to rotate the cylindrical member at a speed representative of the value of the other quantity to be integrated to permit of intermittent passage of light to the light sensitive cell through the slots of the cylindrical member to render said cell operable to close the circuit of the register actuating means and actuate the register at intervals corresponding with fluctuations in the value of the first quantity to be integrated.

4. In an integrating device, a register, electromagnetically operated means to actuate the register, a source of light, a light sensitive cell connected in and operable to normally open the electric circuit of said register actuating means when obscured from the source of light and to close said circuit when exposed to said source of light, mechanism for imparting reciprocatory movement to the light sensitive cell and source of light in correspondence with fluctuations in the value of one of the quantities to be integrated, a rotatable cylindrical member having a peripheral portion interposed between the source of light and the light sensitive cell and arranged with a series of slots equidistantly spaced about and extending longitudinally thereof, said slots varying in length in increments of equal length from minimum to maximum length and arranged so that adjacent slots vary in length more than one increment of length, and means to rotate the cylindrical member at a speed representative of the value of the other quantity to be integrated to permit intermittent passage through the slots of light rays from the source of light to and render the light sensitive cell operable to close the circuit of the register actuating means at intervals corresponding with fluctuations in the value of the first quantity.

5. In an integrating device, a register, electrically operated means to actuate the register, a source of light, a housing having an opening therein for the passage therethrough of rays of light from the source of light, a light sensitive cell mounted in the housing in registry with said opening connected in and operable to close the circuit of the register actuating means when exposed to the source of light through the housing opening, mechanism for simultaneously reciprocating the housing, light sensitive cell and light in correspondence with fluctuations in the value of one of the quantities to be integrated, a light interrupter interposed between the housing and light comprising a screen having slots equidistantly spaced about and extending longitudinally thereof, said slots varying in length in increments of equal length from minimum to maximum length and arranged so that any two adjacent slots vary in length more than a single increment of length, and means to move the screen at a speed representative of the value of the other quantity to be integrated in a direction transversely of the direction of movement of the light sensitive cell and source of light to permit intermittent passage of light at intervals corresponding with fluctuations in the value of the first quantity from the source of light to the light sensitive cell to activate said cell to close the circuit and effect operation of the register actuating means.

6. In an integrating device, a register, means to actuate the register including electromagnetically operated means connected in an open electric circuit adapted to be energized and actuate the register by the closing of said circuit, a light sensitive cell connected in the circuit of the register actuating means operable to close said circuit when exposed to light, a source of light, a condenser interposed between the source of light and light sensitive cell to direct the light rays from the source of light to said cell, said cell, source of light and condenser adapted to have reciprocatory movement in correspondence with fluctuations in the value of one of the quantities to be integrated, a light interrupter comprising a rotatable cylindrical member arranged with a peripheral wall portion interposed between the cell and source of light having slots equidistantly spaced about and extending a direction longitudinally of the light sensitive cell, said slots varying in length in increments of equal length from minimum to maximum length and arranged so that adjacent slots vary in length more than a single increment of length, and means to rotate the cylindrical member in a plane transversely of the movement of the light, cell and condenser at a constant speed representative of the value of the other quantity to be integrated to permit intermittent passage of light rays at intervals corresponding to fluctuations in the value of the first quantity from the source of light to the light sensitive cell to render said cell operable to close the circuit of the register actuating means.

7. In an integrating device, a register, electrically operated means connected in a normally open electric circuit adapted to actuate the register by the closing of said circuit, a light sensitive cell connected in the electric circuit of and controlling the register actuating means operable to close said circuit when exposed to light, a source of light, mechanism to move the light sensitive cell in correspondence with fluctuations in the value of one of the quantities to be integrated, a rotatable cylinder mounted to encircle and with a peripheral portion adjacent the light sensitive cell in all the positions of said cell and rotatable in a direction transversely to the direction of movement of the cell and arranged with a series of slots equidistantly spaced about and extending longitudinally of the peripheral wall of the cylindrical member, said slots varying in length in increments of equal length from minimum to maximum length and arranged so that adjacent slots vary in length more than a single increment of length, and means to rotate the cylinder at a speed representative of the value of the other quantity to be integrated to permit intermittent passage of light to render the light sensitive cell operable to effect intermittent closing of the electric circuit and operation of the register actuating means at intervals corresponding with fluctuations in the value of the first quantity.

8. In an integrating device, a register, electromagnetically operated means to actuate the register when energized, a source of light, a light sensitive cell connected in the electric circuit of the register actuating means operable when exposed to light to close the circuit of and effect operation of the electromagnetically operated register actuating means, mechanism to impart reciprocatory movement to the light sensitive cell in correspondence with fluctuations in the value of one of the quantities to be integrated, a rotatable cylinder mounted to encircle the light sensitive cell and rotate in a plane transversely to the direction of movement of the cell and arranged with a series of slots equidistantly spaced about the peripheral wall and extending from the same level longitudinally of the cylinder, said slots varying in length in increments of equal length from minimum to maximum length and arranged so that adjacent slots vary in length by more than a single increment of length, and means to rotate the cylinder at a speed representative of the value of the other quantity to be integrated to permit intermittent pasage of light to and activate the light sensitive cell and intermittently close the electric circuit of the register actuating means to actuate the register at intervals corresponding with fluctuations in the value of the first quantity.

9. In an integrating device, a register, electrically operated means to actuate the register including a light sensitive cell connected in and normally opening the electric circuit of the register actuating means when obscured from light and operable to close said circuit when exposed to light, mechanism to impart reciprocatory movement to the light sensitive cell in correspondence with fluctuations in the value of one of the quantities to be integrated, a source of light, a hood mounted independently of the mechanism for reciprocating the light sensitive cell with the peripheral wall encircling and interposed between the light sensitive cell and source of light and to rotate in a plane transversely of the direction of movement of the light sensitive cell, said hood having a series of slots equidistantly spaced about and extending longitudinally of the peripheral wall of the hood, and said slots extending from the same plane and varying in length in increments of equal length from minimum to maximum length and arranged so that adjacent slots vary in length more than one increment of length, and means to rotate the hood at a speed representative of the value of the other quantity to be integrated to permit intermittent passage of light from the source of light to and render the light sensitive cell operable to close the circuit of the register actuating means at intervals corresponding with fluctuations in the value of the first quantity.

HERBERT LANSING MERRICK.